United States Patent [19]

Georgeau

[11] 4,271,115

[45] Jun. 2, 1981

[54] METHOD OF PRODUCING A PRE-WET, DUST-FREE FORM OF ASBESTOS SHORT FIBERS

[75] Inventor: Phillip C. Georgeau, Kalamazoo, Mich.

[73] Assignee: Megaloid Chemical Corporation, Kalamazoo, Mich.

[21] Appl. No.: 65,321

[22] Filed: Aug. 9, 1979

[51] Int. Cl.$^3$ ............................................... B01J 2/12
[52] U.S. Cl. .................................................... 264/117
[58] Field of Search ........................................ 264/117

[56] References Cited

U.S. PATENT DOCUMENTS

| | | | |
|---|---|---|---|
| 3,368,004 | 2/1968 | Sirianni et al. | 264/5 |
| 3,532,473 | 10/1970 | Biegler et al. | 23/313 |
| 3,646,183 | 2/1972 | Topcik | 264/117 |
| 3,832,434 | 8/1974 | Hood et al. | 264/117 |
| 3,904,726 | 9/1975 | Jacquelin et al. | 264/117 |

Primary Examiner—Donald E. Czaja
Assistant Examiner—James R. Hall
Attorney, Agent, or Firm—John A. Waters; James F. Lesniak

[57] ABSTRACT

A method of producing a pre-wet, dust-free form of asbestos short fibers comprises admixing about 60–90% by weight of asbestos short fibers with about 10–40% by weight of liquid in a manner so as to produce an agglomerated product, with the liquid including a relatively non-volatile binder comprising about 5–40% of the product, a sufficient quantity of a solvent or volatile component to reduce the viscosity of the liquid to a level that permits easy formation of an agglomerate, and a sufficient quantity of a surfactant to cause thorough wetting of the fibers in the product. The agglomerated product is stored for at least about 24–72 hours after production so as to permit the liquid to completely infiltrate and fully wet the agglomerated product. Hydrophilic liquids are used to produce asbestos agglomerate designed for admixture with predominately polar materials, organophilic liquids are used for producing asbestos agglomerate prepared for admixture with non-polar materials. The resulting compositions are pre-wet for easy admixture with materials of like polarity and remain in an agglomerated, dust-free form during storage and handling for an indefinite period of time.

9 Claims, No Drawings

METHOD OF PRODUCING A PRE-WET, DUST-FREE FORM OF ASBESTOS SHORT FIBERS

BACKGROUND OF THE INVENTION

1. Field of the Invention

This invention relates to a method of producing a pre-wet dust free form of asbestos short fibers by agglomerating the fibers in the presence of a relatively small amount of particular liquids, and a composition of same.

2. Description of the Prior Art

The process of manufacturing asbestos results in asbestos fibers of various lengths. The longer asbestos fibers are useful in various types of products and the short asbestos fibers, sometimes called "floats", are useful in other types of products, notably as reinforcing agents and thickening agents in various types of materials. Asbestos short fibers comprise about 30% of the product in an asbestos manufacturing operation.

Medical evidence gathered over the last forty years demonstrates a clear and direct relationship between several respiratory diseases, mostly notably lung cancer, and chronic inhalation of air-borne particles of asbestos. The incidence of such asbestos related diseases is almost exclusively industrial and occurs predominantly among workers who smoke and have a 10-20 year history of occupational exposure to air-borne asbestos particles.

The most hazardous form of asbestos is the short fibers, since the longer fibers are heavier and do not easily become air borne. The short fibers are usually sold in bulk form in bags or bales to various industries, and it is almost impossible to avoid the creation of a substantial amount of air-borne asbestos fibers in the process of handling these materials.

Some development efforts on the part of asbestos manufacturers have resulted in dry, compressed sheets or pellets of short fiber asbestos, giving this normally bulky material a more compact form and making it more economical to ship and weigh and handle the asbestos. However, these compacted forms still release asbestos short fibers to the air when exposed to the atmosphere, making a dust-free environment difficult to maintain.

Another disadvantage of compacted asbestos lies in the fact that such asbestos pellets or sheets are difficult to break up and disperse for admixture with other materials, thus requiring a high intensity of energy and protracted mixing times to effect such dispersion.

Because compacted forms of asbestos are so energy intensive in processing, they are not popular among manufacturers. Bulky loose forms, with all their problems with air-borne asbestos fibers, are still predominantly used.

Two principal objects of the present invention are to provide a dust-free form of asbestos short fibers for purposes of industrial safety and to provide a uniform, pre-wet granular form of asbestos short fibers that can be transported, weighed, measured, and compounded with other materials with the least possible expenditure of time and energy.

SUMMARY OF THE INVENTION

In accordance with the present invention, a process for producing a dust-free form of asbestos short fibers comprises admixing asbestos short fibers with a liquid in a manner so as to produce an agglomerated product, the liquid being in a sufficient quantity and having a sufficiently low viscosity to permit formation of an agglomerated product by use of conventional agglomeration techniques. The liquid has sufficient wetting qualities such that virtually all the fibers in the agglomerate become wetted. The liquid has a relatively non-volatile residual component that does not evaporate at temperatures to which the product is expected to be subjected during storage and handling, the residual component causing the agglomerated product to be non-friable and preventing the product from reverting to a dry, dust-like form before the product is used. The components of the liquid have a common polarity such that the asbestos short fibers are pre-wet for easy introduction into and mixture with a material of like polarity.

In the preferred practice of the present invention, about 60-90% by weight of asbestos short fibers are combined with about 10-40% by weight of liquid, with the liquid including a non-volatile binder comprising about 5-35% of the product, and a solvent comprising about 5-35% of the product. A surfactant comprising about 0.1-5.0% of the product also can be employed to increase the wetting action of the solvent and binder.

Desirably, the product compromises 70-80% asbestos short fibers, 5-15% of a non volatile binder, 10-20% of a volatile component, and 1-5% of a surfactant.

The liquid components of the product are selected so as to make the asbestos product compatible with the material in which it is to be introduced. For example, if the asbestos short fibers are to be employed in a polar material, hydrophilic liquids are employed in preparing the asbestos agglomerate. Such hydrophilic liquids can be water as a solvent and a polymeric material such as ethylene glycol as a binder. The surfactant can include detergents or water softening agents or other hydrophilic wetting liquids.

When the asbestos short fibers are to be admixed with a non-polar material such as alliphatic solvents, oils, rubber, or polyethylene, organophilic liquids are employed, such as mineral spirits as a solvent, process oil as a polymeric binder, and fatty acid as a surfactant.

The preparation of the composition can be accomplished by any of a number of conventional methods for producing agglomerated materials, such as the use of a low sheer blender. A ribbon blender, auger mixer or a pan or cylindrical agglomerator are satisfactory for this purpose. Asbestos is put in the mixer and the blender is actuated. The liquid is then added by a spray or other dispersed addition, until the right amount of mixture is gradually introduced. When all of the liquid component has been added, the agglomerated granules so formed are virtually dust free.

The agglomerated fibers are closely compacted and within each granule the wetting process of the fibers continues unassisted for about 24-72 hours until the fiber bundles are completely infiltrated and coated with liquid. At this point, the surface free energy of the asbestos is reduced, making the fiber surface more accessible to close physical association with any compound of appropriate solubility (hydrophilic or organophilic) to which it may be later added.

Reduction of the surface free energy of the product by this pre-wetting action results in a reduction in the energy required to further compound the asbestos fiber in other materials.

DESCRIPTION OF PREFERRED EMBODIMENTS

The preferred compositions of the present invention are selected with the following parameters in mind:

The highest percentage of asbestos short fibers possible is desired. This maximizes the quantity of fiber present in the finished product and minimizes the expense and impact of agglomeration components. The product should have at least about 60% asbestos short fibers and cannot have more than about 90% asbestos short fibers and still have enough liquid to form an agglomerate. A preferred range is 70-80% asbestos short fibers.

The liquid must have a sufficiently low viscosity and must be present in a sufficient quantity to permit formation of an agglomerate by use of conventional agglomeration techniques. For agglomeration at room temperature (about 23° C.) the viscosity should not exceed about 1,000 cps. Elevated temperatures may be necessary for agglomeration at higher temperatures.

The liquid also should have a residual component that does not evaporate at temperatures to which the product is expected to be subjected during normal shipping and handling. For most purposes, that temperature would be room temperature (about 23° C.). When used herein, the term "non-volatile" will mean non-volatile at least at room temperature.

To reduce the viscosity of the non-volatile binder for agglomeration purposes and also to reduce the percentage of liquid in the final product, with many binders it is necessary to use a volatile component or solvent of like polarity in combination with the binder. The volatile component will provide viscosity reduction and liquid necessary for agglomeration, and then the solvent will evaporate to leave just the minimum amount of binder in the finished product to maintain the asbestos short fibers in their agglomerated form.

The solvent and/or the binder may have sufficient wetting qualities to cause all the fibers to become wetted. However, asbestos short fibers are difficult to wet, particularly in agglomerated form, so it is desirable to add a surfactant or wetting agent to the product to enhance wetting qualities.

The wetting agent is particularly effective in enabling the liquid to infiltrate and wet the fibers in the center of each agglomerated granule. In many instances, after agglomeration, only the surface fibers of each granule are thoroughly wetted and the internal fibers are relatively dry. If the granules were to remain in this form, normal handling of the granules would cause many to break open, thus releasing dry asbestos fibers to the air. By letting the product rest for 24-72 hours after agglomeration, the liquid (with the assistance of the wetting agent) infiltrates and wets the entire agglomerate, thus making a solid and stable granular structure that is non-friable under even rather harsh handling techniques such as air conveyance through pneumatic tube.

The use of a wetting agent or surfactant also makes it possible to employ a smaller quantity of solvent in order to achieve the same type of final product.

With the liquids employed in the preferred practice of the present invention, the non-volatile binder comprises about 5-35% of the product, with the preferred range being about 5-15%. The solvent or volatile (i.e., volatile at room temperature) component comprises about 5-35% and preferably about 10-20% of the product. The surfactant comprises about 0.1-5.0% of the product, with the preferred range being 1-5%.

It should be understood that the relative quantities of the liquid components depend on the liquids selected for the product. Some liquids having good wetting qualities might not need a surfactant. Also, some liquid binders such as silicone oils may have a sufficiently low viscosity and sufficiently high wetting qualities to require little or no solvent or surfactant.

An exemplary composition of a hydrophilic form of asbestos short fibers comprises the following components in the following proportions:

| | |
|---|---|
| 7RF9 Asbestos | 80% |
| Solvent: Water | 10% |
| Polymeric Binder: | |
| Ethylene Glycol | 5.1% |
| Surfactants: | |
| Triton X 405 (a non-ionic surfactant, polyethoxylated octylphenol) | 2.4% |
| Tamol 850 (a modified polyacrylic acid) | 2.4% |
| Calgon T (sodium pryophosphate) | 0.1% |

The liquids are added drop by drop or in a fine stream, or sprayed on the asbestos in a blender or agglomerator which is running fast enough to freely circulate the composition and roll the moistened fiber particles upon themselves forming small pellets.

The liquids desirably (but not necessarily) are pre-mixed and added together to the dry asbestos. It is also possible to reserve a portion of the solvent (about 10% of the product) for later admixture with the product at the end of the agglomeration process. This produces a smaller and more uniform granule size.

The agglomerated pellets thus produced may be discharged from the mixer, and the wetting process (adsorption and absorption) of the liquid components continues for 24 to 72 hours until the fibers are coated and bound to one another by the liquid component.

The agglomerate is then stable and non-friable and will not revert to a dry dust-like form.

These pellets can then be handled and used without danger of airborn fiber particle release.

This form of hydrophilic asbestos short fibers is designed for admixture with a polar material and is miscible in other polar liquids, such as water, alcohols, and glycols. Since the asbestos short fibers are pre-wet, admixture of these fibers into other polar materials is greatly facilitated. Handling transportion, weighing, and other such operations are facilitated by the agglomerated form of the asbestos short fibers.

An exemplary embodiment of an organophilic form of asbestos short fiber agglomerate includes the following components:

| | |
|---|---|
| 7RF9 Asbestos | 75% |
| Solvent: Mineral Spirits | 18.25% |
| Polymeric Binder: | |
| Process Oil | 5.25% |
| Surfactant: Fatty Acid | 1.5% |

The liquid is pre-mixed and added to the asbestos short fibers in the same manner described above for the polar compound. If a smaller, more uniform particle size is desired, only 8.25% of the 18.25% solvent is included in the pre-mixed liquid. The remaining mineral spirits are reserved for later mixing.

This type of organophilic asbestos agglomerate is designed for use in connection with non-polar materials such as alliphatic or aromatic solvents, oils, rubber, polyethelene, and polyesters.

The surfactants employed in the present invention can be any one of four different types, namely, nonionic, cationic, anionic, and amphoteric. While the addition of a surfactant may not be absolutely essential to the implementation of the process of the present invention, a surfactant enhances the wetting action of the various liquids and is, therefore, a highly desirable component of the composition.

It should be understood that the embodiments described herein are merely exemplary of the preferred practice of the present invention and that various modifications and changes may be made in the compositions and methods disclosed herein without departing from the spirit and scope of the present invention.

The embodiments of the invention in which an exclusive property or privilege is claimed are defined as follows:

1. A method of producing pre-wet, dust-free, agglomerated short fiber asbestos granules comprising:

admixing from about 60 percent to about 90 percent by weight asbestos short fibers and from about 10 percent to about 40 percent by weight agglomerating liquid, said agglomerating liquid comprising a wetting solvent and a binder, said wetting solvent being generally volatile at the anticipated storage temperature for said granules and said binder being generally involatile at the anticipated storage temperature for said granules;

continuing mixing the admixture to circulate the composition and roll the wetted fibers upon themselves until granules are formed; and thereafter allowing the granules to rest from about 24 to about 72 hours to yield stable, non-friable granules.

2. The method according to claim 1 wherein said admixture comprises from about 5 percent to about 35 percent by weight of said wetting solvent and from about 5 percent to about 35 percent by weight of said binder.

3. The method according to claim 2 wherein said admixture further comprises from about 0.1 percent to about 5 percent by weight of a surfactant.

4. The method according to claim 3 wherein said admixture comprises from about 70 percent to about 80 percent by weight of said asbestos short fibers, from about 5 percent to about 15 percent by weight of said binder, from about 10 percent to about 20 percent by weight of said wetting solvent, and from about 1 percent to about 5 percent by weight of said surfactant.

5. The method according to claim 1 wherein said wetting solvent is water and said binder is ethylene glycol.

6. The method according to claim 1 wherein said wetting solvent is mineral spirits and said binder is process oil.

7. The method according to claim 3 wherein said wetting solvent is water, said binder is ethylene glycol, and said surfactant is a mixture of polyethoxylated octylphenol, a modified polyacrylic acid, and sodium pyrophosphate.

8. The method according to claim 3 wherein said wetting solvent is mineral spirits, said binder is process oil, and said surfactant is a fatty acid.

9. The product produced in accordance with the method of claims 1, 2, 3, 4, 5, 6, 7, or 8.

* * * * *